(12) United States Patent
Yun

(10) Patent No.: US 7,610,688 B2
(45) Date of Patent: Nov. 3, 2009

(54) SHOES WITH LEVELING INSTRUMENT

(76) Inventor: Ji Hae Yun, 107-105 Daejayeon Maeul Apt., Gwangeo 1-dong, Seo-gu, Daejeon (KR)

( * ) Notice: Subject to any disclaimer, the term of this patent is extended or adjusted under 35 U.S.C. 154(b) by 0 days.

(21) Appl. No.: 12/042,273

(22) Filed: Mar. 4, 2008

(65) Prior Publication Data

US 2008/0155843 A1 Jul. 3, 2008

Related U.S. Application Data

(63) Continuation of application No. PCT/KR2007/006812, filed on Dec. 26, 2007.

(51) Int. Cl.
*A43B 5/00* (2006.01)
*A63B 69/36* (2006.01)
*G01C 9/24* (2006.01)

(52) U.S. Cl. .............. 33/333; 36/132; 36/127; 36/136; 473/404; 473/217

(58) Field of Classification Search .......... 33/333, 33/334, 370; 36/132, 127, 136; 473/404, 473/217

See application file for complete search history.

(56) References Cited

U.S. PATENT DOCUMENTS

| 1,292,969 | A | * | 1/1919 | Sturgis | 33/382 |
|---|---|---|---|---|---|
| 2,494,278 | A | * | 1/1950 | Badovinac | 33/370 |
| 2,932,303 | A | * | 4/1960 | Smith | 132/214 |
| 2,976,046 | A | * | 3/1961 | McCullough, Jr | 473/241 |
| 3,306,618 | A | * | 2/1967 | Liljequist | 473/241 |
| 4,457,078 | A | * | 7/1984 | Suchy | 33/334 |
| 5,063,679 | A | * | 11/1991 | Schwandt | 33/347 |
| 5,219,169 | A | * | 6/1993 | Martini | 473/241 |
| 5,820,476 | A | * | 10/1998 | Amato | 473/217 |
| 6,095,933 | A | * | 8/2000 | Smith | 473/404 |

(Continued)

FOREIGN PATENT DOCUMENTS

JP 2005-296114 A 10/2005

(Continued)

OTHER PUBLICATIONS

International Search Report (for PCT/KR2007/006812), Apr. 15, 2008.

*Primary Examiner*—Christopher W Fulton
(74) *Attorney, Agent, or Firm*—Park & Associates IP Law LLC

(57) ABSTRACT

A shoe with a leveling instrument for detecting a relative height and a gradient of a ground to step thereon with the shoe, includes an outsole disposed at a lower portion of the shoe, an upper disposed at an upper portion of the outsole, an x-direction leveling instrument formed or affixed at the girth (i.e., an upper strip portion or welt) of a front end portion of the outsole or the upper, a top surface thereof being externally exposed, and a y-direction leveling instrument formed or affixed at the girth of a side portion of the outsole or the upper thereof, a top surface thereof being externally exposed. Accordingly, the shoes having the leveling instrument can detect the relative height and the gradient around the ground stepped by a user, whereby helping to correct a swing posture of a golfer, conduct a measurement operation of various engineers in architectural and civil engineering etc., and correct a walking posture of a walker.

13 Claims, 15 Drawing Sheets

U.S. PATENT DOCUMENTS 6,568,021 B1 * 5/2003 Wood .................. 15/235.4
6,665,962 B2 * 12/2003 Shepherd .................. 36/132
7,150,587 B2 * 12/2006 Dils et al. .................. 408/16

FOREIGN PATENT DOCUMENTS

| KR | 20-0200026 | Y1 | 10/2000 |
| KR | 20-0240630 | Y1 | 10/2001 |
| KR | 20-0402824 | Y1 | 12/2005 |

* cited by examiner

US 7,610,688 B2

SHOES WITH LEVELING INSTRUMENT

REFERENCE TO RELATED APPLICATIONS

This is a continuation of pending International Patent Application PCT/KR2007/006812 filed on Dec. 26, 2007, which designates the United States and claims priority of Korean Patent Applications No. 10-2006-0134425 filed on Dec. 27, 2006 and No. 10-2007-0118690 filed Nov. 20, 2007.

FIELD OF THE INVENTION

The present invention relates to shoes with a leveling instrument and more particularly, to shoes with a leveling instrument in that an x-direction leveling instrument and an y-direction leveling instrument are formed at the girth of an outsole or uppers of leather, so that it can grasp the relative height and the gradient around the ground stepped by a user, whereby helping to correct a swing posture of a golfer, conduct a measurement operation of various engineers in architectural and civil engineering etc., and correct a walking posture of a walker.

BACKGROUND OF THE INVENTION

FIG. 1 is a sectional view illustrating conventional shoes with a leveling instrument.

As shown in FIG. 1, the conventional shoes with the leveling instrument includes a leveling instrument 2 attached to the front upper portion of the golfer shoes 1, a fixing device 3 for horizontal maintenance formed at the lower portion of the leveling instrument 2.

Accordingly, since the leveling instrument 2 for horizontal maintenance is attached to the front upper portion of the golfer shoes 1 through the fixing device 3, the golfer can grasp the relative height, the gradient and so on of the field or the green, so that he can determine the approach posture and the hitting direction and strength of the golf ball for shot and putting, thereby improving the shot and putting abilities thereof.

However, in the conventional shoes with the leveling instrument, since the circular leveling instrument 2 empty of a sense of direction is attached to the front upper portion of the golfer shoes 1, while the horizontal condition of the field or the green can be easily grasped, it is hard to exactly grasp the relative height and the gradient of the field or the green on the whole. Accordingly, there is a problem in that it can make a mistake of the shot or the putting owing to wrong approach posture, hitting direction, and hitting strength.

Also, in the conventional shoes with the leveling instrument, since the golfer hunches and stretches his back repeatedly during wearing thereof, it can interfere with the bending movement of the foot during moving, shot or putting of the golfer. Moreover, because the leveling instrument 2 can be easily detached to the fixing device 3 due to the bending movement of the foot, it can be disabled.

Furthermore, in the conventional shoes with the leveling instrument, since the circular leveling instrument 2 is protruded from the front upper portion of the golfer shoes 1, there is a problem in that the external appearance is poor, thereby leading to an aversion to the shoes.

FIG. 2 is a planar view illustrating anther conventional shoes with the leveling instrument.

As shown in FIG. 2, the leveling instrument 6 is attached to the inside surface 5a of the heel 5 of the golf shoes 4.

FIG. 3 and FIG. 4 are side sectional views illustrating further anther conventional shoes with the leveling instrument.

As shown in FIG. 3, the leveling instrument 6 is foldably attached through a hinge 9 between the protection plate 7 for supporting the leveling instrument 6 and the horizontal connector 8 formed at the heel 5 of the golf shoes 4.

As shown in FIG. 4, the leveling instrument 6 is attached and detached to the shoes by inserting the connecting pin 7a of the protection plate 7 for supporting the leveling instrument 6 into the connecting groove 5b formed at the heel 5 of the golf shoes 4.

In this conventional shoes with the leveling instrument 6, since the leveling instrument 6 is attached to the inside surface 5a of the heel 5 of the golf shoes 4, the golfer can grasp the relative height, the gradient and so on of the field or the green, so that he can determine the approach posture and the hitting direction and strength of the golf ball for shot and putting, thereby improving the shot and putting abilities thereof.

However, in the conventional shoes with the leveling instrument 6, since the leveling instrument 6 is attached to the inside surface 5a of the heel 5 of the golf shoes 4, where the golfer steps on the corresponding field, the leveling instrument 6 is covered with his trousers, so that it cannot observe the leveling instrument 6.

Also, in case of the foldable leveling instrument 6, since the leveling instrument 6 is folded during moving, while being unfold during shot or putting, it is inconvenient for using. Moreover, in case of the attachable and detachable leveling instrument 6, there are problems in that it can interfere with his action during moving, shot or putting and the leveling instrument 6 can be easily separated owing to even small impact.

Furthermore, in the conventional shoes with the foldable leveling instrument and the attached and detached leveling instrument, since the structures thereof are complicated, the components is increased, thereby increasing the manufacturing cost of the completed product.

Also, it has not proposed mountain-climbing boots, work shoes having the leveling instrument yet.

SUMMARY OF THE INVENTION

It is, therefore, an object of the present invention is to provide shoes with a leveling instrument in that top surfaces of an x-direction leveling instrument and an y-direction leveling instrument are exposed to the girth of an outsole, so that it can grasp the relative height and the gradient around the field or the green stepped by a golfer, whereby remarkably improving the observation efficiency.

Another object of the present invention is to provide shoes with a leveling instrument in that top surfaces of an x-direction leveling instrument and an y-direction leveling instrument are exposed to the girth of an outsole of working shoes, so that various engineers in architectural and civil engineering etc. can easily conduct a measurement operation without separate leveling instruments.

Further another object of the present invention is to provide shoes with a leveling instrument in that an x-direction leveling instrument and an y-direction leveling instrument are formed at the girth of an outsole of mountain-climbing boots, so that it can grasp the relative height and the gradient around the ground, whereby being a good guide on its surroundings.

Further another object of the present invention is to provide shoes with a leveling instrument in that it can maintain the proper balance between an inside and an outside of user's foot during working, so that it can correct a walking posture of a walker and help to correct an ankle of the walker.

Further another object of the present invention is to provide shoes with a leveling instrument capable of helping to correct the walking posture of a walking model.

Further another object of the present invention is to provide shoes with a leveling instrument in that an inconvenience and aversion to the shoes can be removed during wearing thereof, so that it can offer a convenience in use.

Further another object of the present invention is to provide shoes with a leveling instrument in that the structures thereof are very simple, so that the components is minimized, thereby remarkably decreasing the manufacturing cost of the completed product.

Further another object of the present invention is to provide shoes with a leveling instrument in that an x-direction leveling instrument and an y-direction leveling instrument are integrally formed at an outsole, so that the manufacturing process is simply, thereby preventing the loss of the leveling instrument.

Further another object of the present invention is to provide shoes with a leveling instrument capable of easily attaching and detaching an x-direction leveling instrument and an y-direction leveling instrument to an outsole of general shoes.

Further another object of the present invention is to provide shoes with a leveling instrument in that the slant of an x-direction leveling instrument and an y-direction leveling instrument can be adjusted, so that the slant of the leveling instrument is adjusted according to its surroundings, whereby maintain the accuracy of the leveling instrument at all times.

To achieve the above objects of the present invention, there is provided shoes with a leveling instrument for checking out a relative height and a gradient of a ground comprising: an outsole formed at a lower portion thereof; an upper of leather formed at an upper portion thereof; an x-direction leveling instrument formed at the girth of a front end portion of the outsole or the upper of leather, a top surface thereof being exposed to outside; and an y-direction leveling instrument formed at the girth of a side portion of the outsole or the upper of leather thereof, a top surface thereof being exposed to outside.

Preferably, the x-direction leveling instrument and the y-direction leveling instrument are integrally formed at the outsole or the upper of leather.

Preferably, the x-direction leveling instrument and the y-direction leveling instrument are attached and detached to the outsole or the upper of leather.

To achieve the above objects of the present invention, there is provided shoes with a leveling instrument for checking out a relative height and a gradient of a ground comprising: an outsole formed at a lower portion thereof; an upper of leather formed at an upper portion thereof; an auxiliary outsole formed at the girth of the outsole; an x-direction leveling instrument formed at the girth of a front end portion of the auxiliary outsole, a top surface thereof being exposed to outside; and an y-direction leveling instrument formed at the girth of a side portion of the auxiliary outsole, a top surface thereof being exposed to outside.

Preferably, a slant adjusting means for adjusting a slant thereof is formed on at least any one of the x-direction leveling instrument and the y-direction leveling instrument.

BRIEF DESCRIPTION OF THE DRAWINGS

The above as well as the other objects, features and advantages of the present invention will be more apparent from the following detailed description taken in conjunction with the accompanying drawings, in which.

DETAILED DESCRIPTION OF THE INVENTION

A preferred embodiment of the invention will be described in detail below.

Example 1

Figure 1:
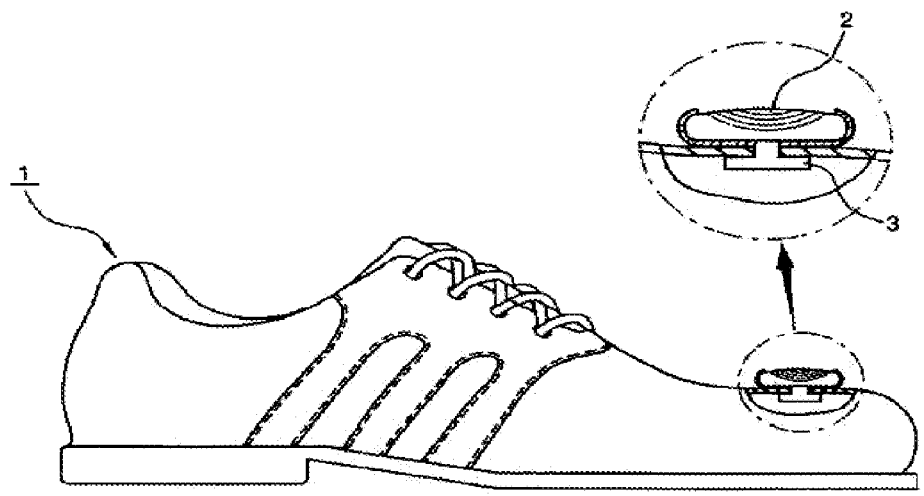
FIG. 1 is a sectional view illustrating the conventional shoes with a leveling instrument.
Figure 2:
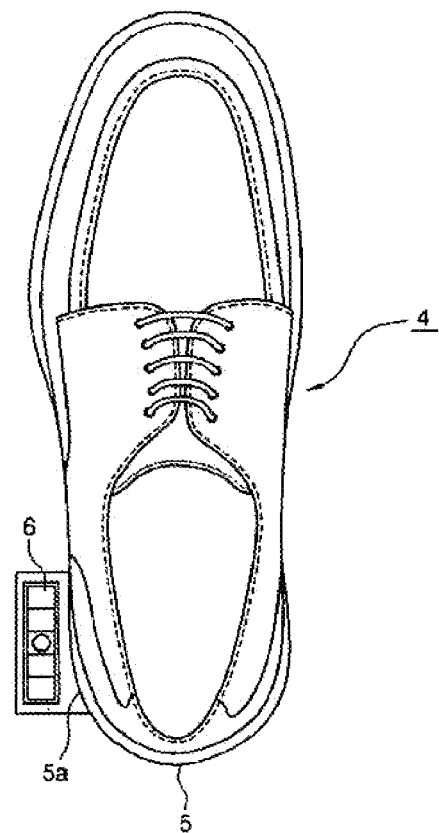
FIG. 2 is a planar view illustrating other conventional shoes with the leveling instrument.
Figure 3:
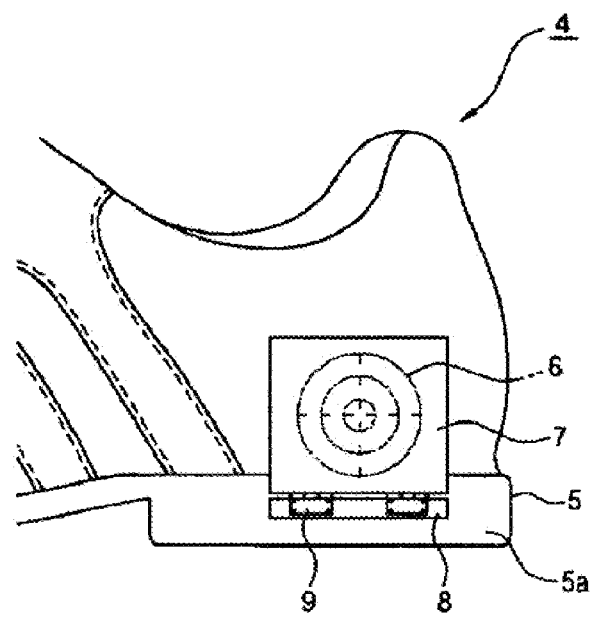
FIG. 3 and FIG. 4 are side sectional views illustrating further anther conventional shoes with the leveling instrument.
Figure 4:
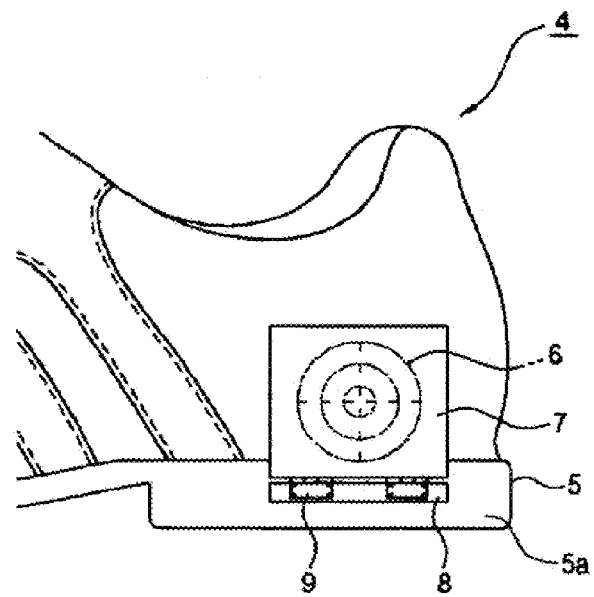
Figure 5:
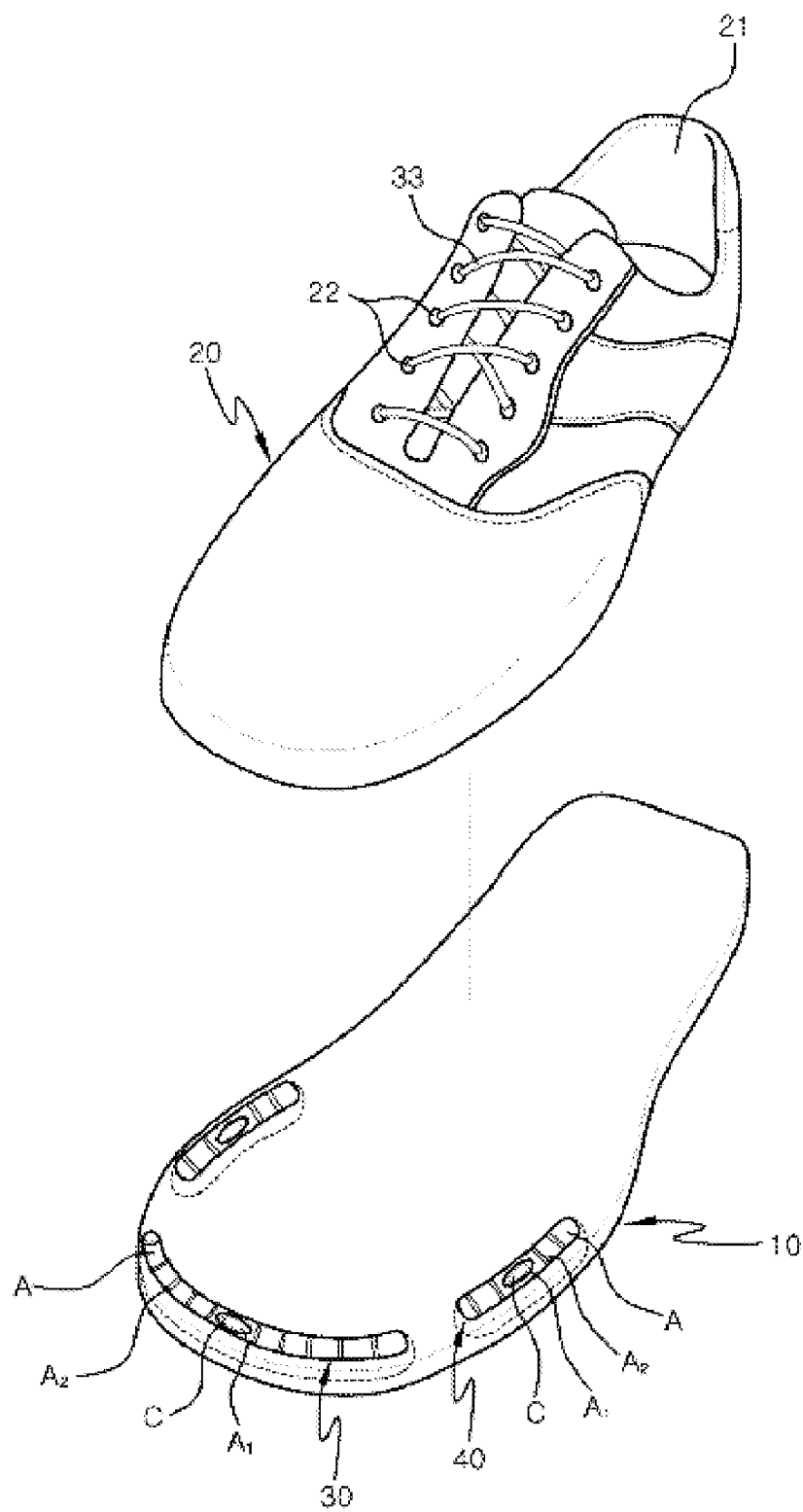
FIG. 5 and FIG. 5A are schematically exploded perspective views illustrating shoes having an x-direction leveling instrument and an y-direction leveling instrument integrally formed at an outsole or an upper of leather thereof, respectively, according to one embodiment of the present invention.
Figure 5A:
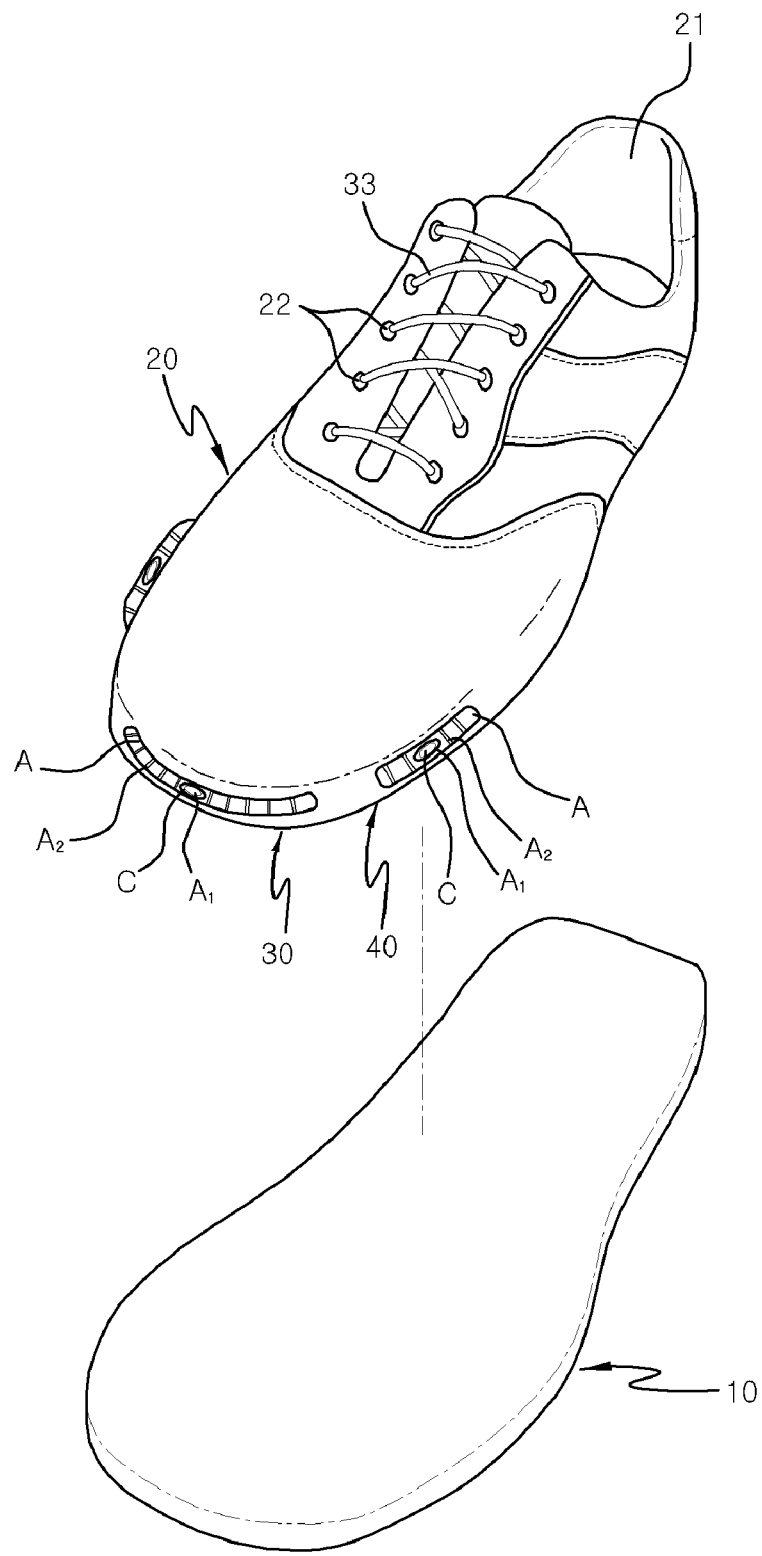
Figure 6:
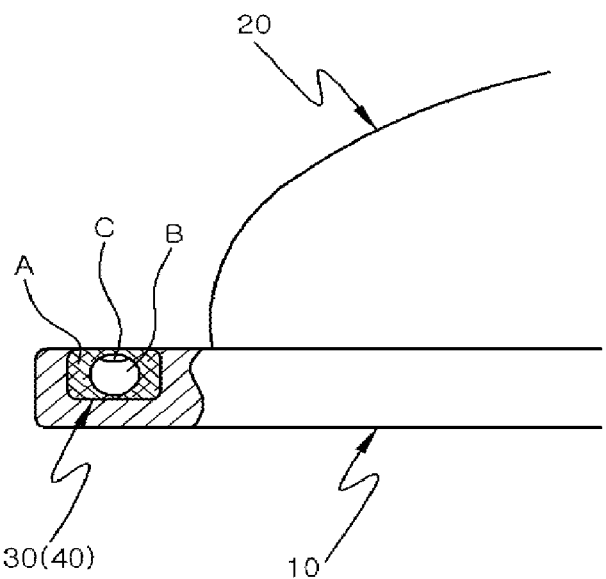
FIG. 6 is a partially sectional view illustrating shoes of FIG. 5.
Figure 7:
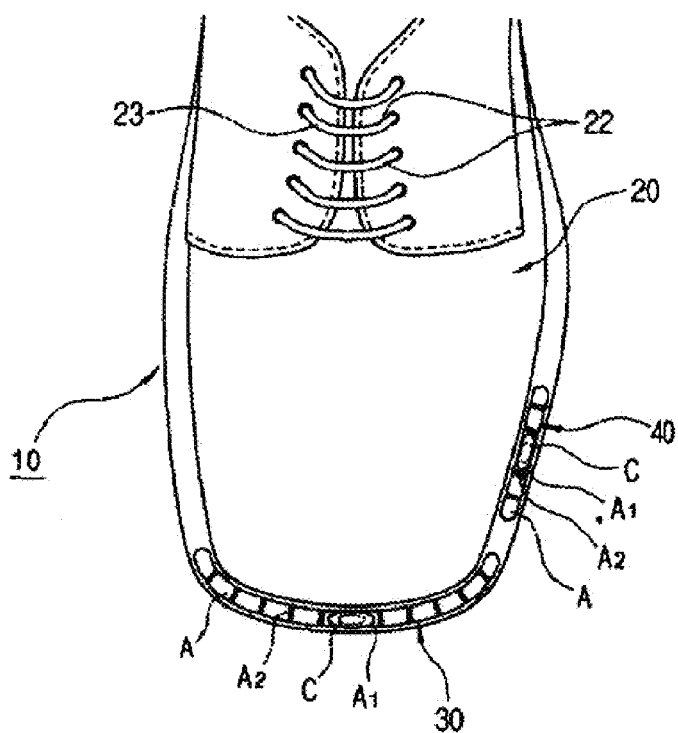
FIG. 7 and FIG. 8 are partially planar views illustrating shoes of FIG. 5.
Figure 8:
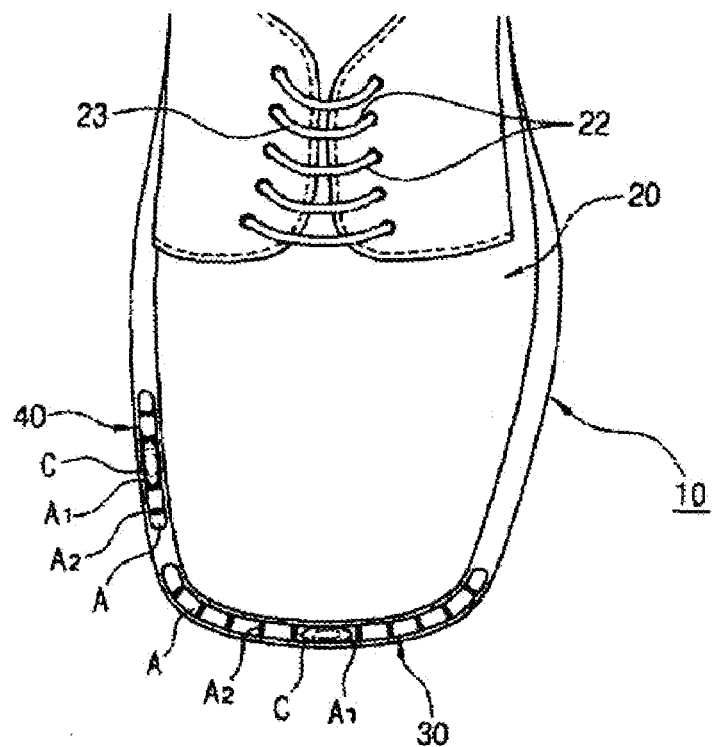

Shoes Having X-Direction Leveling Instrument and Y-Direction Leveling Instrument Integrally Formed at Outsole FIG. 5 and FIG. 5A are schematically exploded perspective views illustrating shoes having an x-direction leveling instrument and an y-direction leveling instrument integrally formed at an outsole 10 or an upper of leather thereof, respectively, according to one embodiment of the present invention.

In order to typically manufacture the shoes having the x-direction leveling instrument 30 and the y-direction leveling instrument 40 integrally formed at the outsole 10, the x-direction leveling instrument 30 and the y-direction leveling instrument 40 can be inserted into predetermined positions before the liquid resin is sufficiently cooled during molding of the outsole 10 or upper of leather 20, or the x-direction leveling instrument 30 and the y-direction leveling instrument 40 are previously inserted into the molding frame the outsole 10 or upper of leather 20 and then, the resin for molding the outsole 10 is injected into the molding frame to be cooled.

Also, except that the separate x-direction leveling instrument and y-direction leveling instrument are integrally formed at the outsole 10, the x-direction leveling instrument and the y-direction leveling instrument can be formed together with the outsole 10.

Concretely, during the forming of the outsole 10, predetermined spaces are formed inside the girth of a front end portion and the girth of a side portion thereof and liquid materials B and the bubbles C are injected into the spaces, so that the x-direction leveling instrument 30 and the y-direction leveling instrument 40 can be integrally formed with the outsole 10.

Besides, tow products can be integrally formed through the well-known various molding methods.

Here, preferably, each top surface of the x-direction leveling instrument 30 and the y-direction leveling instrument 40 reaches or is protruded from the upper portion of the outsole 10 in order to easily check out the states thereof when seen from the outside.

Also, preferably, the bottom surface of the outsole 10 is flat, so that it can serve as a base level for displaying the unevenness and the gradient around the field or the green on the x-direction leveling instrument 30 and the y-direction leveling instrument 40 with accuracy.

The upper of leather 20 for corresponding to the top of the foot and the heel of the wearer is made of flexible leather. Also, the upper of leather 20 is attached to the upper portion of the outsole and has an opening portion 21 for inserting or extracting the wearer's foot at rear portion thereof.

Also, the upper of leather 20 further includes inserting holes 22 for tightening or untying a string 23 arranged and formed at both front cutting portions thereof.

Each of the x-direction leveling instrument 30 and the y-direction leveling instrument 40 includes a flexible tube A having a scale portion A1 for horizontal display formed lengthwise at the center thereof in a predetermined width and two scale portions A2 for inclination display formed at both sides of the scale portion A1 for horizontal display and a liquid material B for forming bubbles C injected into and sealed by the flexible tube A, so that it serves to display the unevenness and the gradient about the field or the green through the moving bubbles C.

Here, the present invention is not limited to the structures of the x-direction leveling instrument 30 and the y-direction leveling instrument 40 shown in the drawings. Accordingly, it can be applied to well-known leveling instruments of various kinds.

Figure 9:
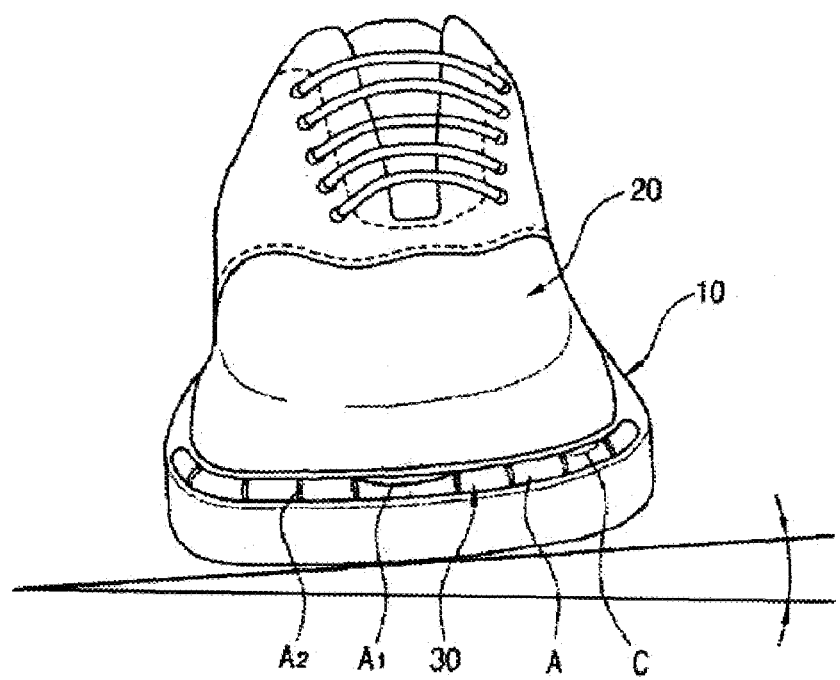
FIG. 9 and FIG. 10 are front views illustrating an operating state of the x-direction leveling instrument according to the present invention.
Figure 10:
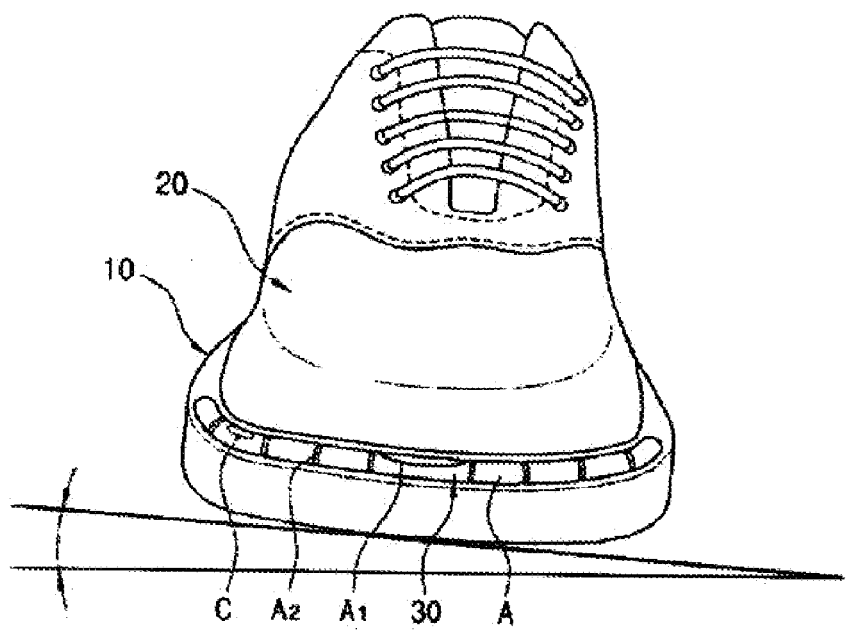
Figure 11:
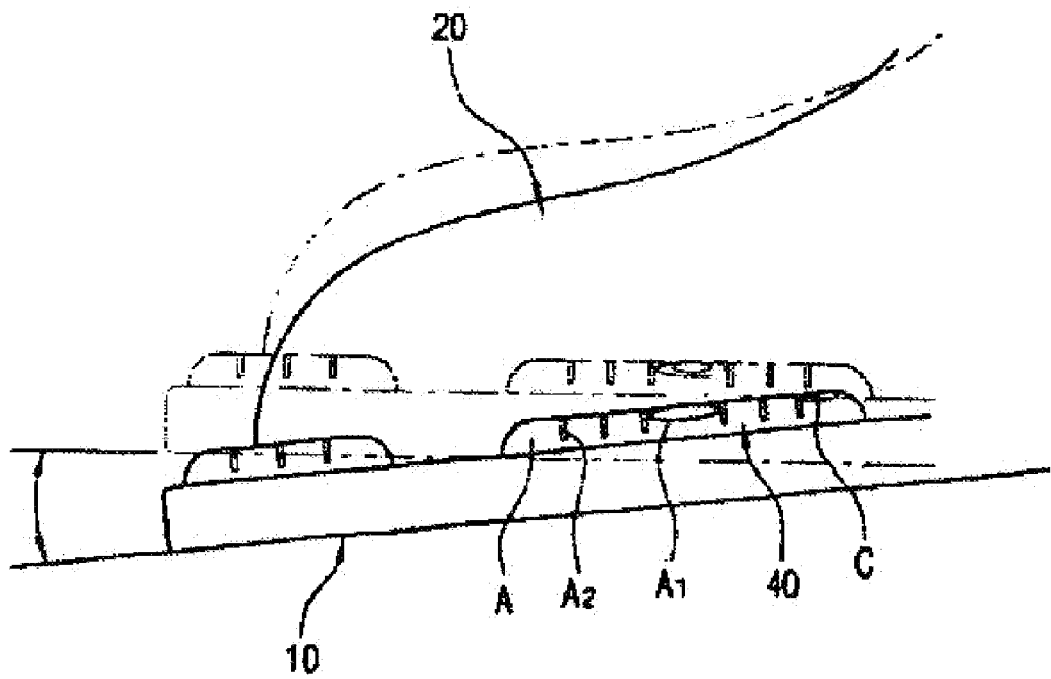
FIG. 11 and FIG. 12 are front views illustrating an operating state of the x-direction leveling instrument according to the present invention.
Figure 12:
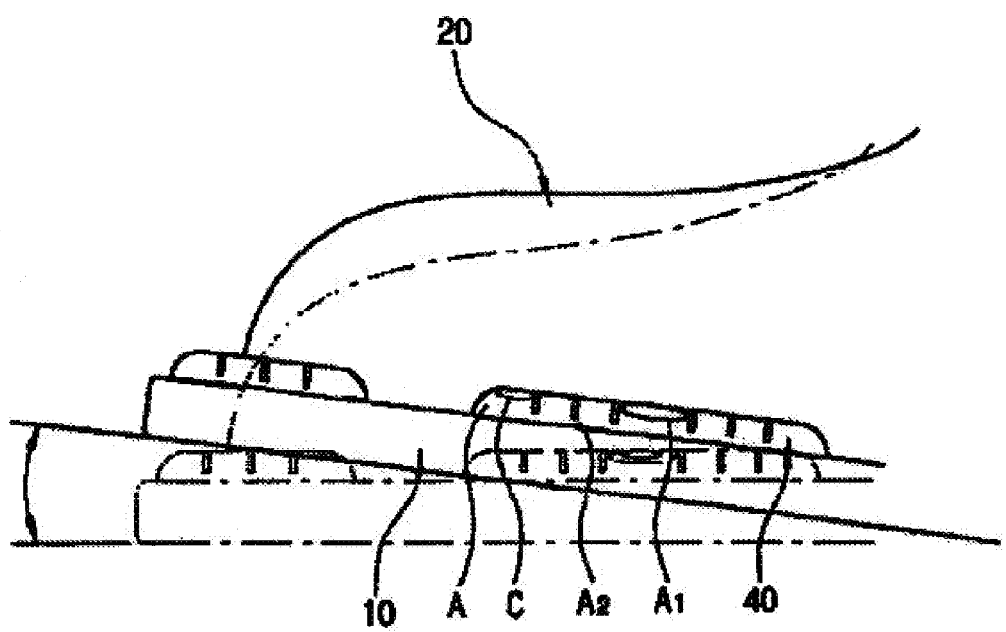

As shown in FIG. 9 and FIG. 10, when the foot of a golfer wearing the shoes having the x-direction leveling instrument 30 and the y-direction leveling instrument according to the present invention is putted on the field or the green, the bubble C of the x-direction leveling instrument 30 is moved in the flexible tube A by the outsole 10 slanted right and left according to the condition of the field or the green, so that it can display the unevenness and the gradient in the right and left directions. Also, as shown in FIG. 11 and FIG. 12, when the foot of the golfer wearing the shoes having the x-direction leveling instrument 30 and the y-direction leveling instrument 40 according to the present invention is putted on the field or the green, the bubble C of the y-direction leveling instrument 40 is moved in the flexible tube A by the outsole 10 slanted upward and downward according to the condition of the field or the green, so that it can display the unevenness and the gradient in the up-and-down directions.

Here, the color liquid materials B having a color compared with the outsole 10 are injected into the flexible tubes A of each of the x-direction leveling instrument 30 and the y-direction leveling instrument 40, so that the golfer can observe the x-direction leveling instrument 30 and the y-direction leveling instrument 40 more easily with the naked eye.

Figure 21:
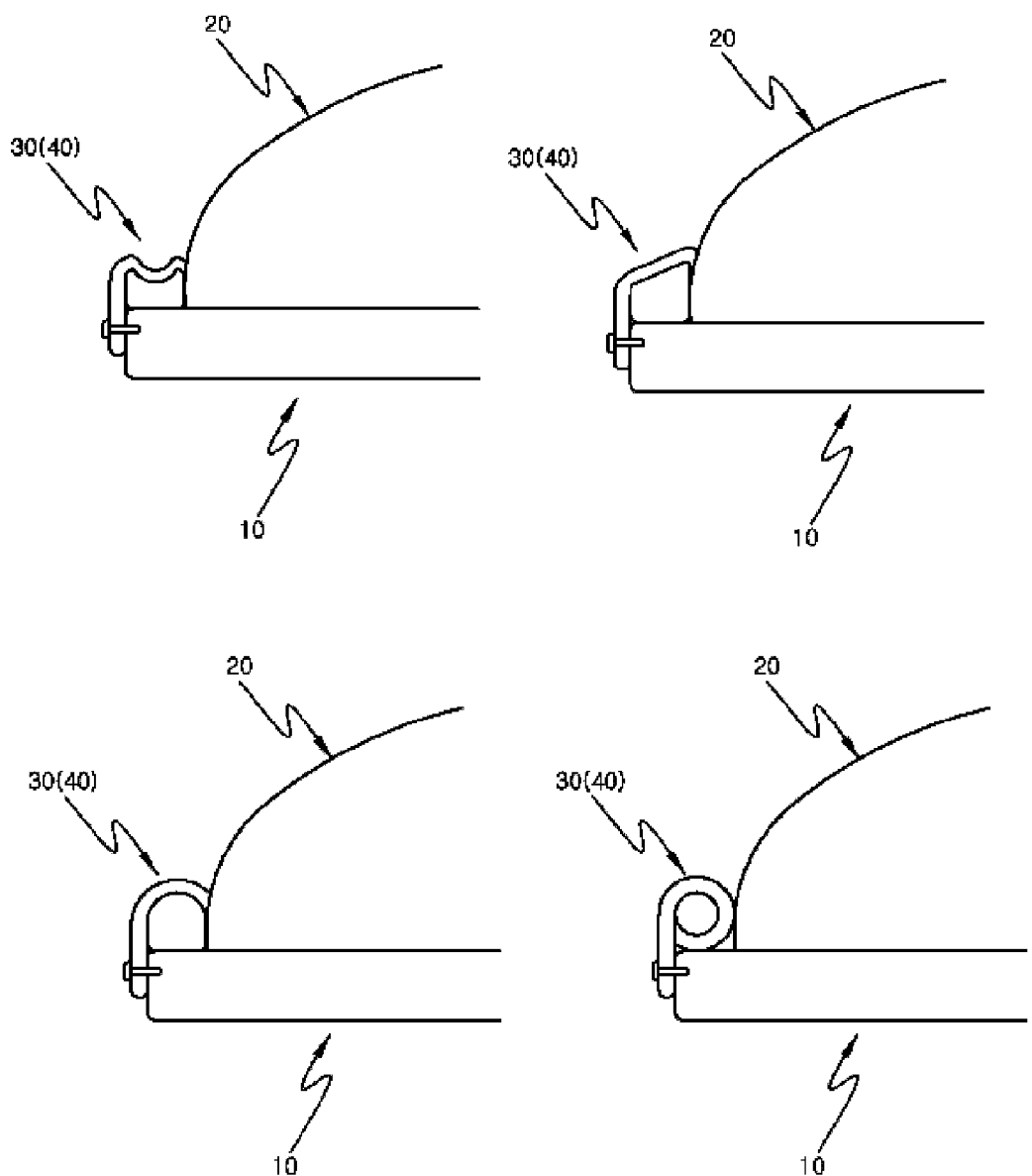
FIG. 21 is a schematically sectional view illustrating various examples of a sectional shape of a leveling instrument according to the present invention.

As shown in FIG. 21, each cross section of the x-direction leveling instrument 30 and the y-direction leveling instrument 40 may be a concave shape, a convex shape, a slanted shape and so forth. Also, the planar shape of each of the x-direction leveling instrument 30 and the y-direction leveling instrument 40 may be various.

Also, the y-direction leveling instrument 40 can be formed at the corresponding inside and outside portions of the foot or any one of at the corresponding inside and outside portions of the foot.

Example 2

Figure 13:
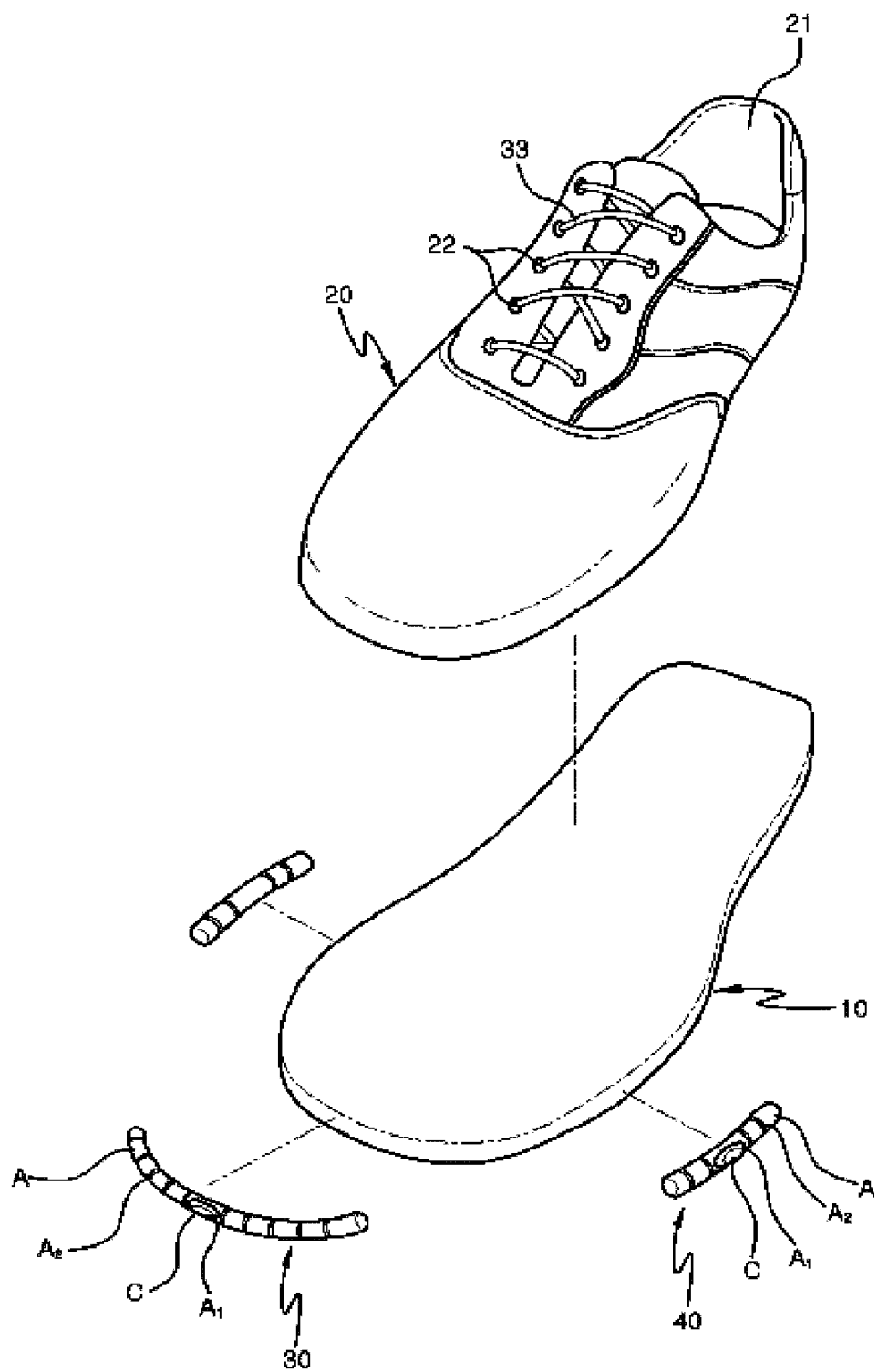
FIG. 13 and FIG. 14 are a schematically exploded perspective view illustrating shoes having an x-direction leveling instrument and an y-direction leveling instrument formed at a side wall surface of the girth of an outsole according to another embodiment of the present invention.

Shoes Having X-Direction Leveling Instrument and Y-Direction Leveling Instrument Attachable and Detachable to Outsole FIG. 13 is a schematically exploded perspective view illustrating shoes having an x-direction leveling instrument and an y-direction leveling instrument formed at a side wall surface of the girth of an outsole 10 according to another embodiment of the present invention.

Here, the structures of the x-direction leveling instrument 30 and the y-direction leveling instrument 40 can be applied to well-known leveling instruments of various kinds like the example 1.

The means for attaching and detaching the x-direction leveling instrument 30 and the y-direction leveling instrument 40 to the outsole 10 may be a bolt or screw nail of a simple structure, a Velcro tape, a button, a string and so on.

Also, a bolt body is integrally formed at one side of each of the x-direction leveling instrument 30 and the y-direction leveling instrument 40, so that it can be fixed without a separate connecting member.

In this manner, where the x-direction leveling instrument 30 and the y-direction leveling instrument 40 are formed at the side wall surface of the girth of the outsole 10, the x-direction leveling instrument 30 and the y-direction leveling instrument 40 can be damaged on account of a collision with the field or the obstacle during working or running.

Figure 14:
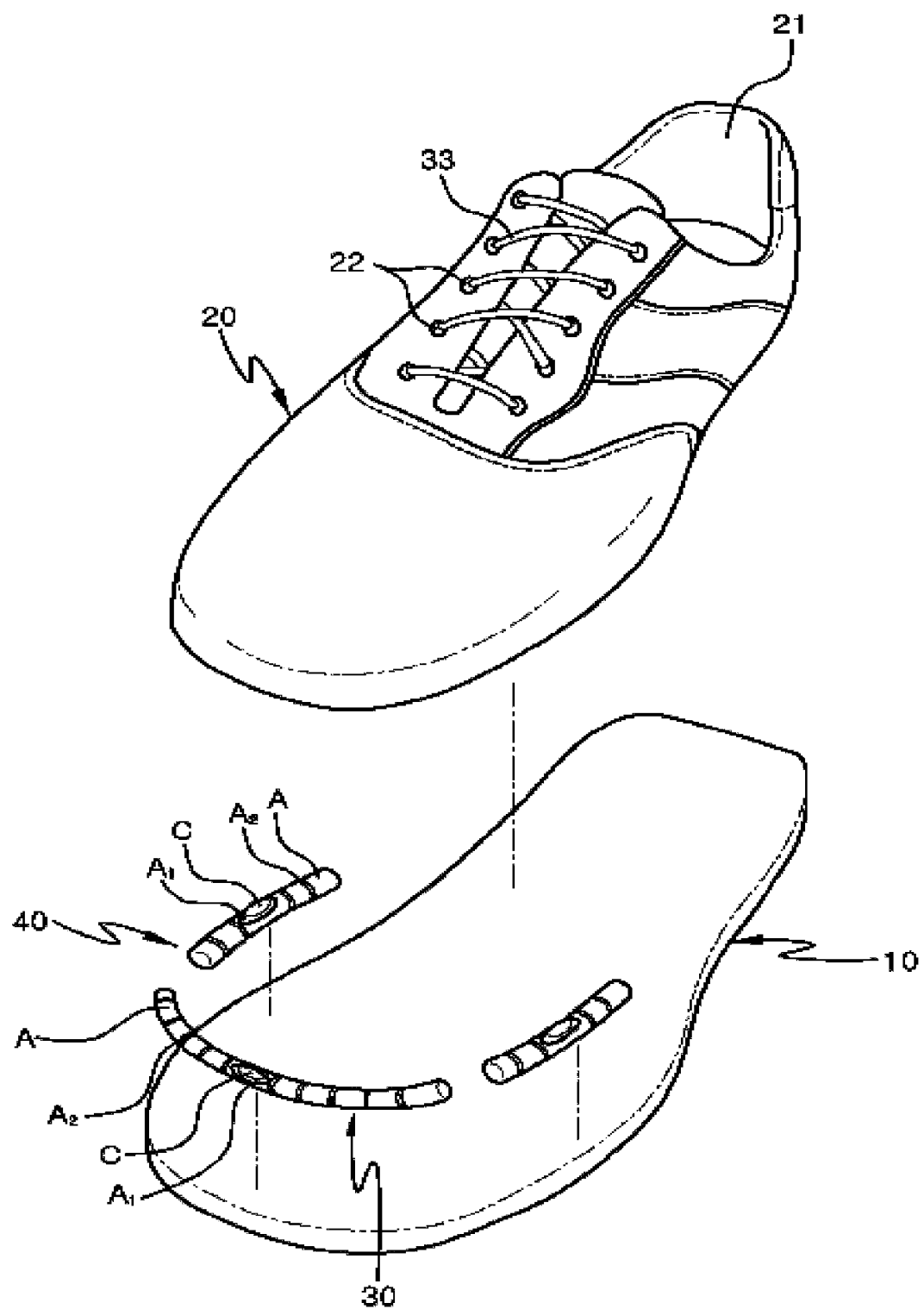
Figure 15:
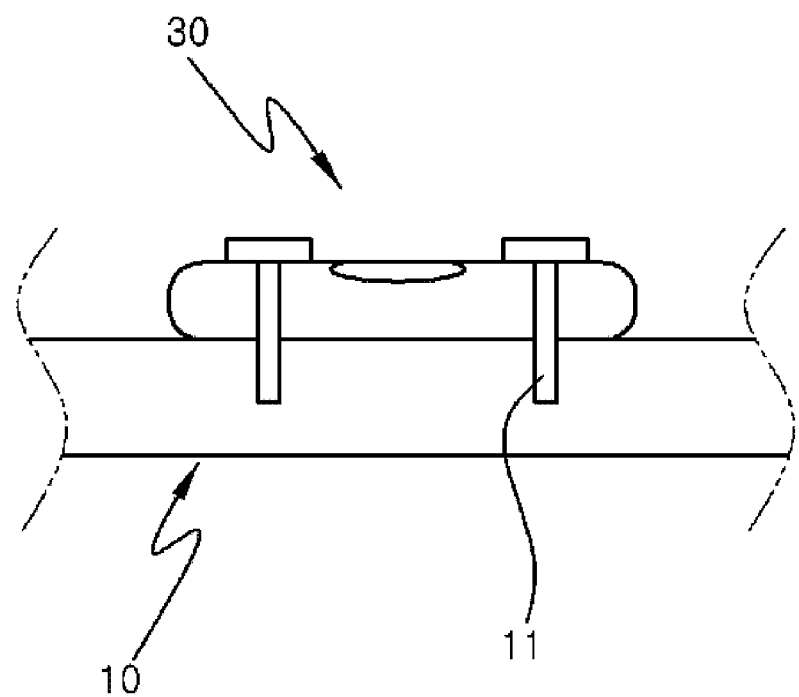
FIG. 15 and FIG. 16 are schematically sectional views illustrating a state of mounting slant adjusting means on an x-direction leveling instrument according to the present invention.
Figure 16:
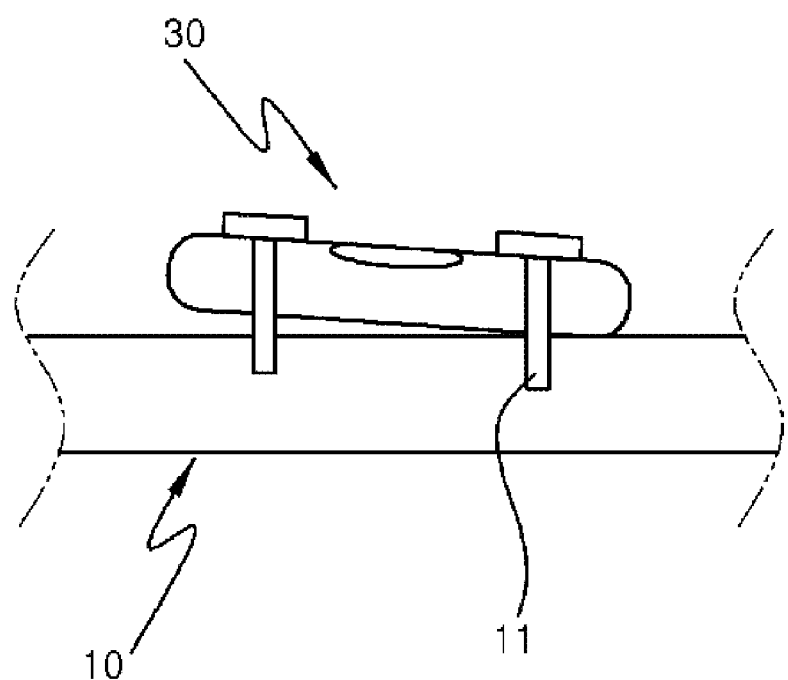
Figure 17:
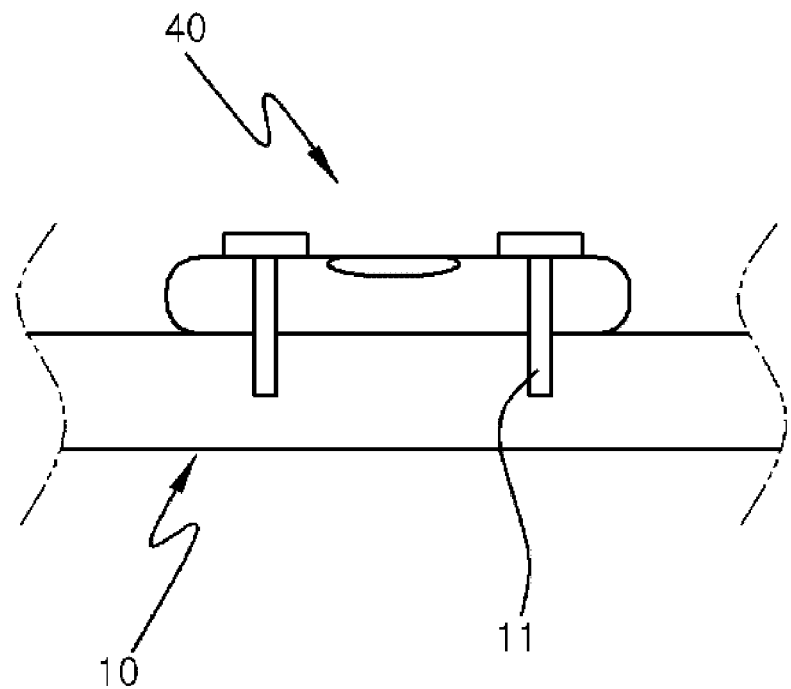
FIG. 17 and FIG. 18 are schematically sectional views illustrating a state of mounting slant adjusting means on an y-direction leveling instrument according to the present invention.
Figure 18:
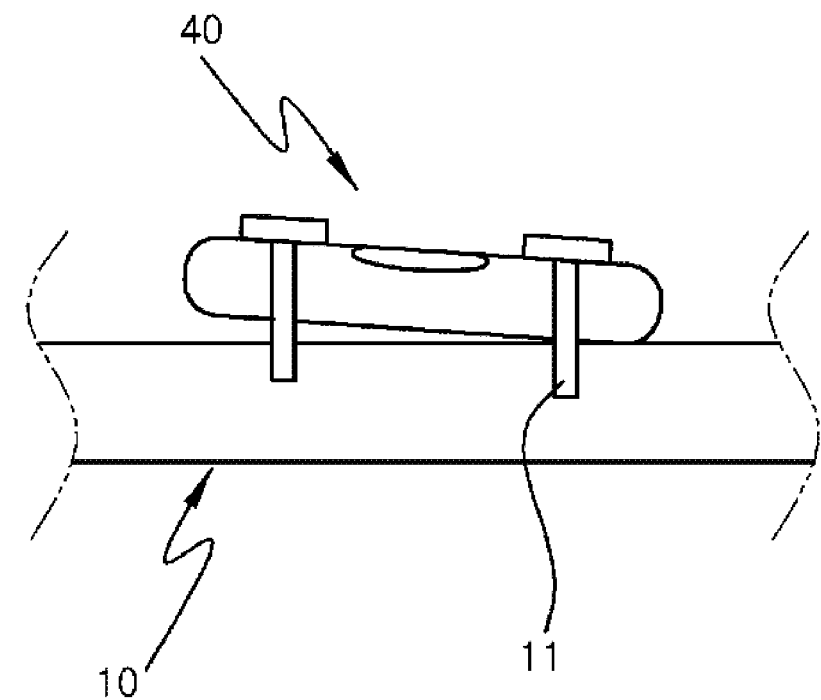
Figure 19:
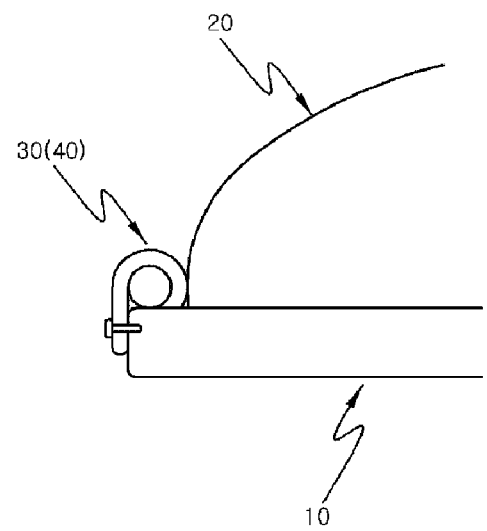
FIG. 19 and FIG. 20 are a schematically sectional view and a perspective view illustrating a state of mounting other slant adjusting means on an x-direction leveling instrument and an y-direction leveling instrument according to the present invention.
Figure 20:
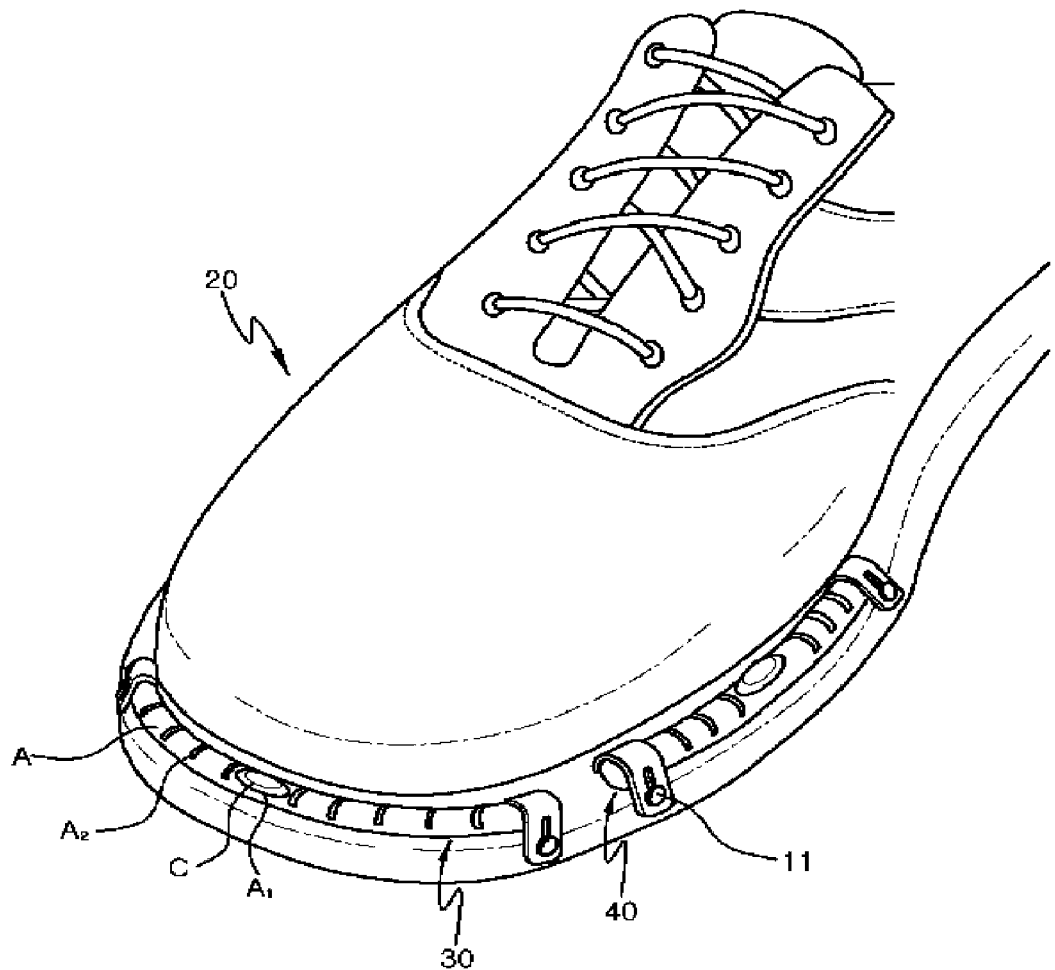

In order to solve the dangerousness, as shown in FIG. 14, the x-direction leveling instrument 30 and the y-direction leveling instrument 40 can be formed at the top surface of the girth of the outsole 10.

At this time, as described above, the means for attaching and detaching the x-direction leveling instrument 30 and the y-direction leveling instrument 40 to the outsole 10 may be the bolt, the screw nail, the Velcro tape, the button, the string, the integrated bolt body and so on.

Accordingly, the x-direction leveling instrument 30 and the y-direction leveling instrument 40 can be attachable and detachable to the outsole 10, so that they can be freely attachable and detachable to the general shoes.

Also, since a part of the shoes is elegant in terms of a design thereof, the x-direction leveling instrument 30 and the y-direction leveling instrument 40 can be attachable to the outsole 10 thereof during golfing, while being detachable to the outsole 10 during the general activity.

Example 3

Shoes Capable of Adjusting Slant of X-Direction Leveling Instrument and Y-Direction Leveling Instrument Since the outsole 10 made of synthetic resins can be transformed owing to use for a long time or temperature changes, the bubbles C of the x-direction leveling instrument 30 and the y-direction leveling instrument 40 may not located almost at the middle thereof.

In order to solve this problem, FIG. 15 through FIG. 18 illustrate sectional views of shoes capable of adjusting a slant of an x-direction leveling instrument and an y-direction leveling instrument according to another embodiment of the present invention.

Here, the structures of the x-direction leveling instrument 30 and the y-direction leveling instrument 40 can be applied to well-known leveling instruments of various kinds like the example 1.

As shown in the drawings, bolt bodies are formed at both sides of each of the x-direction leveling instrument 30 and the y-direction leveling instrument 40 and bolt holes for inserting each bolt body are formed at the outsole 10.

Accordingly, one side or the other side of each of the x-direction leveling instrument 30 and the y-direction leveling instrument 40 can ascend and descend according to the fastening of each bolt.

That is, after the user puts the shoes on an even surface, where the bubbles C are not located almost at the middle of the x-direction leveling instrument 30 and the y-direction leveling instrument 40, each bolt thereof can be adjusted, so that the bubbles C can be located at the middle thereof.

Also, as shown in the drawings, one side of each of the x-direction leveling instrument 30 and the y-direction leveling instrument 40 is wound in the type of a ring and holes are vertically formed at the inside thereof so as to move the bolt body along each hole, so that it is provided with slant adjusting means 11 capable of adjusting the slant according to the movement of each bolt body.

Here, it utilizes the bolt body as the slant adjusting means 11 for adjusting the slant of each of the x-direction leveling instrument 30 and the y-direction leveling instrument 40 in the drawings. However, the present invention is not limited to the structures of the slant adjusting means. Accordingly, it can be applied to well-known height adjusting apparatus of various kinds.

Also, it can utilize the bolt body for attachment and detachment described in the example 2 as the slant adjusting means.

Example 4

Figure 22:
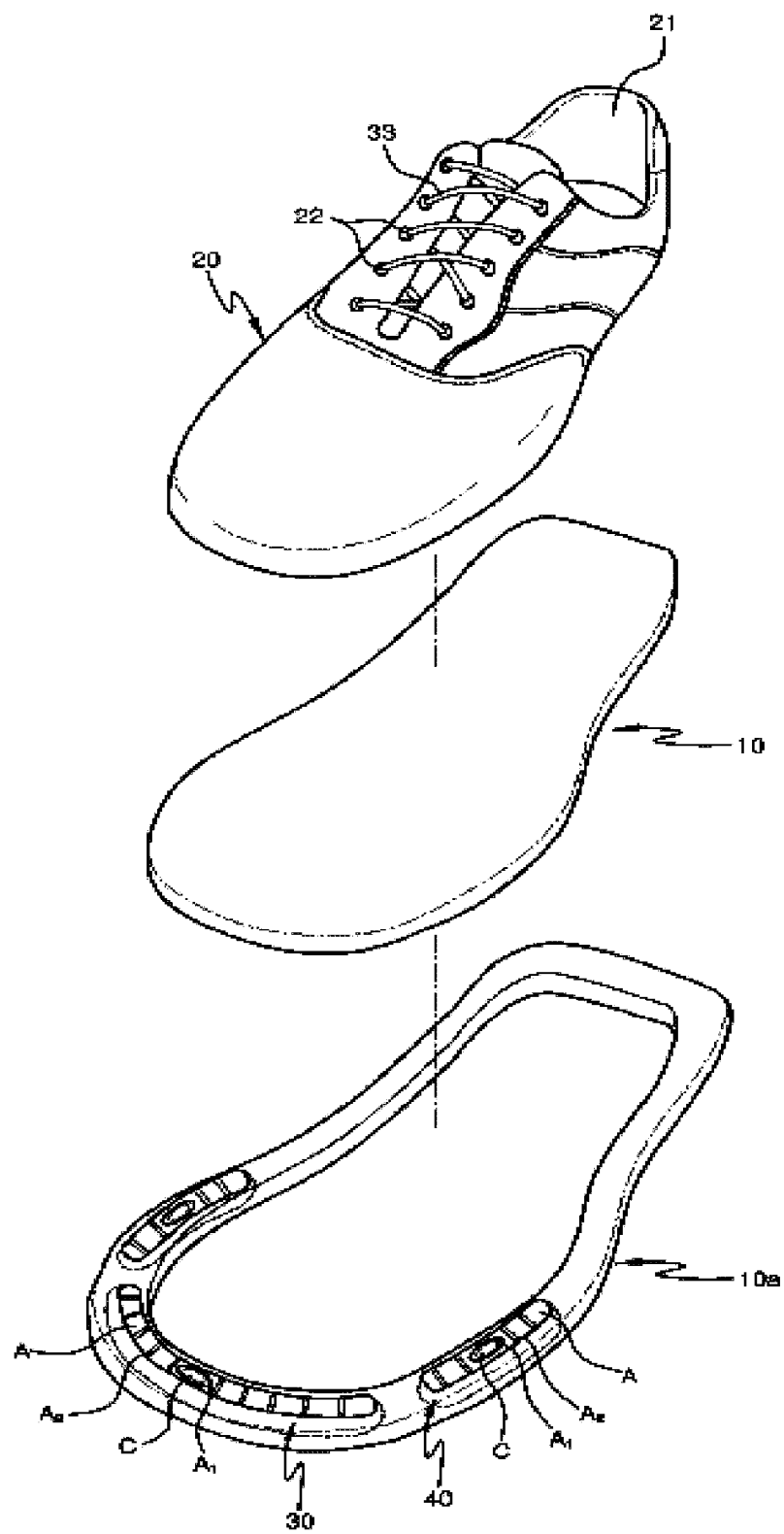
FIG. 22 is a perspective view illustrating an example 4 according to the present invention.

Shoes Having X-Direction Leveling Instrument and Y-Direction Leveling Instrument Formed at Auxiliary Outsole FIG. 22 is an exploded perspective view illustrating shoes having an x-direction leveling instrument and an y-direction leveling instrument formed at auxiliary outsole according to further another embodiment of the present invention.

As shown in FIG. 22, the an auxiliary outsole 10a is formed at the girth of the outsole 10 and the x-direction leveling instrument and the y-direction leveling instrument are integrally formed at the girth of a front end portion and the girth of a side portion of the auxiliary outsole 10a respectively.

Here, the outsole 10 and the auxiliary outsole 10a are coupled to each other through a bonding, bolting, sewing and so on.

Accordingly, the x-direction leveling instrument and the y-direction leveling instrument are filled in the auxiliary outsole 10a and the outsole 10 and the auxiliary outsole 10a are fixed to each other, thereby the establishment thereof is simplified.

Here, the present invention is not limited to only the golf shoes shown as described above. Accordingly, it can be applied to shoes of various kinds.

That is, where it is applied to the shoes of the engineers in architectural and civil engineering etc., they can easily conduct various measurement operations according to the necessary environments.

Accordingly, since a separate leveling instrument is not unnecessary, the portable equipment of the engineer can be decreased.

Also, during mountaineering, it can grasp the relative height and the gradient around the configuration of the corresponding location.

Moreover, it can correct the walking posture of the walker through the leveling instrument.

Furthermore, it can provide shoes with the leveling instrument capable of helping to correct the walking posture of a walking model.

As described above, according to the shoes with the leveling instrument, top surfaces of an x-direction leveling instrument and an y-direction leveling instrument are exposed to the girth of an outsole, so that it can grasp the relative height and the gradient around the field or the green stepped by a golfer, whereby remarkably improving the observation efficiency.

Also, top surfaces of the x-direction leveling instrument and an y-direction leveling instrument are exposed to the girth of the outsole of working shoes, so that various engineers in architectural and civil engineering etc. can easily conduct the measurement operation without separate leveling instruments.

Moreover, the x-direction leveling instrument and an y-direction leveling instrument are formed at the girth of an outsole of mountain-climbing boots, so that it can grasp the relative height and the gradient around the configuration of the ground, whereby being a good guide on its surroundings.

Furthermore, it can maintain the proper balance between inside and outside of foot during working, so that it can correct the walking posture of the walker and help to correct an ankle of the walker.

Especially, it can provide shoes with the leveling instrument capable of helping to correct the walking posture of a walking model.

Also, the inconvenience and aversion to the shoes can be removed during wearing thereof, so that it can offer a convenience in use.

Moreover, the structures thereof are very simple, so that the components is minimized, thereby remarkably decreasing the manufacturing cost of the completed product.

Furthermore, the x-direction leveling instrument and the y-direction leveling instrument are integrally formed at the outsole, so that the manufacturing process is simply, thereby preventing the loss of the leveling instrument.

Also, it can provide the shoes with the leveling instrument capable of easily attaching and detaching the x-direction leveling instrument and the y-direction leveling instrument to the outsole of general shoes.

Moreover, the slant of the x-direction leveling instrument and the y-direction leveling instrument can be adjusted, so that the slant of the leveling instrument is adjusted according to its surroundings, whereby maintain the accuracy of the leveling instrument at all times.

Furthermore, the shoes having the x-direction leveling instrument and the y-direction leveling instrument according to the present invention can be applied various fields in need of grasping of the relative height and the gradient around the ground.

Finally, it can correct the walking posture of the walker and help to correct an ankle of the walker.

While this invention has been described in connection with what are presently considered to be the most practical and preferred embodiments, it is to be understood that the invention is not limited to the disclosed embodiments and the drawings, but, on the contrary, it is intended to cover various modifications and variations within the spirit and scope of the appended claims.

What is claimed is:

1. A shoe with a leveling instrument for detecting a relative height and a gradient of a ground to step on with the shoe, comprising:
    an outsole;
    an upper affixed at an upper portion of the outsole;
    an x-direction leveling instrument affixed at an upper surface of a front end portion of the outsole or the upper, the upper surface thereof being externally exposed; and
    a y-direction leveling instrument affixed at an upper surface of a side end portion of the outsole or the upper, the upper surface thereof being externally exposed.

2. The shoe with a leveling instrument as claimed in claim 1, wherein the x-direction leveling instrument and the y-direction leveling instrument are integrally formed with the outsole or the upper.

3. The shoe with a leveling instrument as claimed in claim 1, wherein the x-direction leveling instrument and the y-direction leveling instrument are capable of attaching to and detaching from the outsole or the upper.

4. A shoe with a leveling instrument for detecting a relative height and a gradient of a ground to step on with the shoe, comprising:
    an outsole;
    an upper affixed at an upper portion of the outsole;
    an auxiliary outsole attached to an external surface of the outsole;
    an x-direction leveling instrument affixed at an upper surface of a front end portion of the auxiliary outsole, the upper surface thereof being exposed to outside; and
    a y-direction leveling instrument affixed at an upper surface of a side end portion of the auxiliary outsole, the upper surface thereof being exposed to outside.

5. The shoe with a leveling instrument as claimed in claim 1, further including a slant adjusting means for adjusting a slant of at least any one of the x-direction leveling instrument and the y-direction leveling instrument.

6. The shoe with a leveling instrument as claimed in claim 4, further including a slant adjusting means for adjusting a slant of at least any one of the x-direction leveling instrument and the y-direction leveling instrument.

7. The shoe with a leveling instrument as claimed in claim 1, wherein the shoe is a golf shoe.

8. The shoe with a leveling instrument as claimed in claim 4, wherein the shoe is a golf shoe.

9. The shoe with a leveling instrument as claimed in claim 1, wherein the y-direction leveling instrument has one leveling component affixed to either a medial side or a lateral side of the outsole or the upper.

10. The shoe with a leveling instrument as claimed in claim 1, wherein the y-direction leveling instrument has two leveling components, one affixed to a medial side and the other to a lateral side of the outsole or the upper.

11. The shoe with a leveling instrument as claimed in claim 5, wherein the slant adjusting means includes a bolt or screw to adjust a height of one lateral side relative to an opposite lateral side of the leveling instrument.

12. The shoe with a leveling instrument as claimed in claim 6, wherein the slant adjusting means includes a bolt or screw to adjust a height of one lateral side relative to an opposite lateral side of the leveling instrument.

13. The shoe with a leveling instrument as claimed in claim 1, wherein the leveling instrument contains a color liquid material with a color different from a color of the outsole or the upper to which the leveling instrument is affixed in order to facilitate for a wearer to observe a measurement of the leveling instrument.

* * * * *